(12) United States Patent
Kaneko et al.

(10) Patent No.: US 8,409,464 B2
(45) Date of Patent: Apr. 2, 2013

(54) LUBRICANT FOR COMPRESSION REFRIGERATING MACHINE AND REFRIGERATING APPARATUS USING THE SAME

(75) Inventors: Masato Kaneko, Chiba (JP); Harutomo Ikeda, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 94 days.

(21) Appl. No.: 12/443,488

(22) PCT Filed: Sep. 25, 2007

(86) PCT No.: PCT/JP2007/068549
§ 371 (c)(1),
(2), (4) Date: Mar. 30, 2009

(87) PCT Pub. No.: WO2008/041549
PCT Pub. Date: Apr. 10, 2008

(65) Prior Publication Data
US 2010/0025621 A1 Feb. 4, 2010

(30) Foreign Application Priority Data
Sep. 29, 2006 (JP) .................. 2006-269257

(51) Int. Cl.
C09K 5/04 (2006.01)
(52) U.S. Cl. .................................. 252/68
(58) Field of Classification Search .............. 252/68
See application file for complete search history.

(56) References Cited

U.S. PATENT DOCUMENTS

| | | | |
|---|---|---|---|
| 5,449,472 A * | 9/1995 | Egawa et al. | 252/68 |
| 6,261,474 B1 | 7/2001 | Egawa et al. | |
| 6,306,803 B1 | 10/2001 | Tazaki | |
| 6,458,288 B1 | 10/2002 | Kawaguchi et al. | |
| 6,475,405 B1 | 11/2002 | Kawaguchi et al. | |
| 6,613,725 B1 | 9/2003 | Tazaki | |
| 6,878,677 B1 * | 4/2005 | Sakanoue et al. | 508/433 |
| 7,517,839 B2 | 4/2009 | Kawaguchi et al. | |
| 7,531,488 B2 | 5/2009 | Kawaguchi et al. | |
| 2003/0032563 A1 | 2/2003 | Tazaki | |
| 2006/0240996 A1 * | 10/2006 | Hayashi et al. | 508/198 |
| 2009/0000331 A1 | 1/2009 | Nagao et al. | |

FOREIGN PATENT DOCUMENTS

| | | |
|---|---|---|
| EP | 0 507 158 A1 | 10/1992 |
| EP | 0 644 175 A1 | 3/1995 |
| EP | 0 732 391 A1 | 9/1996 |
| EP | 1 063 279 A1 | 12/2000 |
| EP | 1 167 495 A1 | 1/2002 |
| EP | 1 234 868 A1 | 8/2002 |
| EP | 1491616 * | 12/2004 |
| JP | 8 193196 | 7/1996 |
| JP | 10 46169 | 2/1998 |
| JP | 2001 3072 | 1/2001 |
| WO | 01 12763 | 2/2001 |
| WO | 01 48127 | 7/2001 |
| WO | 2007 029746 | 3/2007 |

OTHER PUBLICATIONS

U.S. Appl. No. 12/433,500, filed Mar. 30, 2009, Kaneko, et al.
U.S. Appl. No. 12/433,606, filed Mar. 30, 2009, Kaneko, et al.
U.S. Appl. No. 12/433,494, filed Mar. 30, 2009, Kaneko, et al.
U.S. Appl. No. 12/443,486, filed Mar. 30, 2009, Kaneko, et al.
U.S. Appl. No. 12/443,501, filed Mar. 30, 2009, Kaneko, et al.
U.S. Appl. No. 12/093,727, filed May 15, 2008, Kaneko.
U.S. Appl. No. 08/130,843, filed Oct. 4, 1993, Kawaguchi, et al.
U.S. Appl. No. 07/444,932, filed Dec. 4, 1989, Kawaguchi, et al.
U.S. Appl. No. 13/026,689, filed Feb. 14, 2011, Kaneko.
Extended European Search Report issued Apr. 1, 2011, in Application No. / Patent No. 07828366.0—2104 / 2071012 PCT/JP2007068549.

* cited by examiner

*Primary Examiner* — John Hardee
(74) *Attorney, Agent, or Firm* — Oblon, Spivak, McClelland, Maier & Neustadt, L.L.P.

(57) ABSTRACT

The present invention provides a lubricating oil for a compression type refrigerator including a polyvinyl ether-based compound containing an alkylene glycol or polyoxyalkylene glycol unit and a vinyl ether unit in a molecule and having a molecular weight in a range of 300 to 3,000, and an organic carboxylic acid alkali metal salt. The lubricating oil for a compression type refrigerator of the present invention has high miscibility and high viscosity index, and excellent in wear resistance and storage stability under carbon dioxide atmosphere.

10 Claims, 1 Drawing Sheet

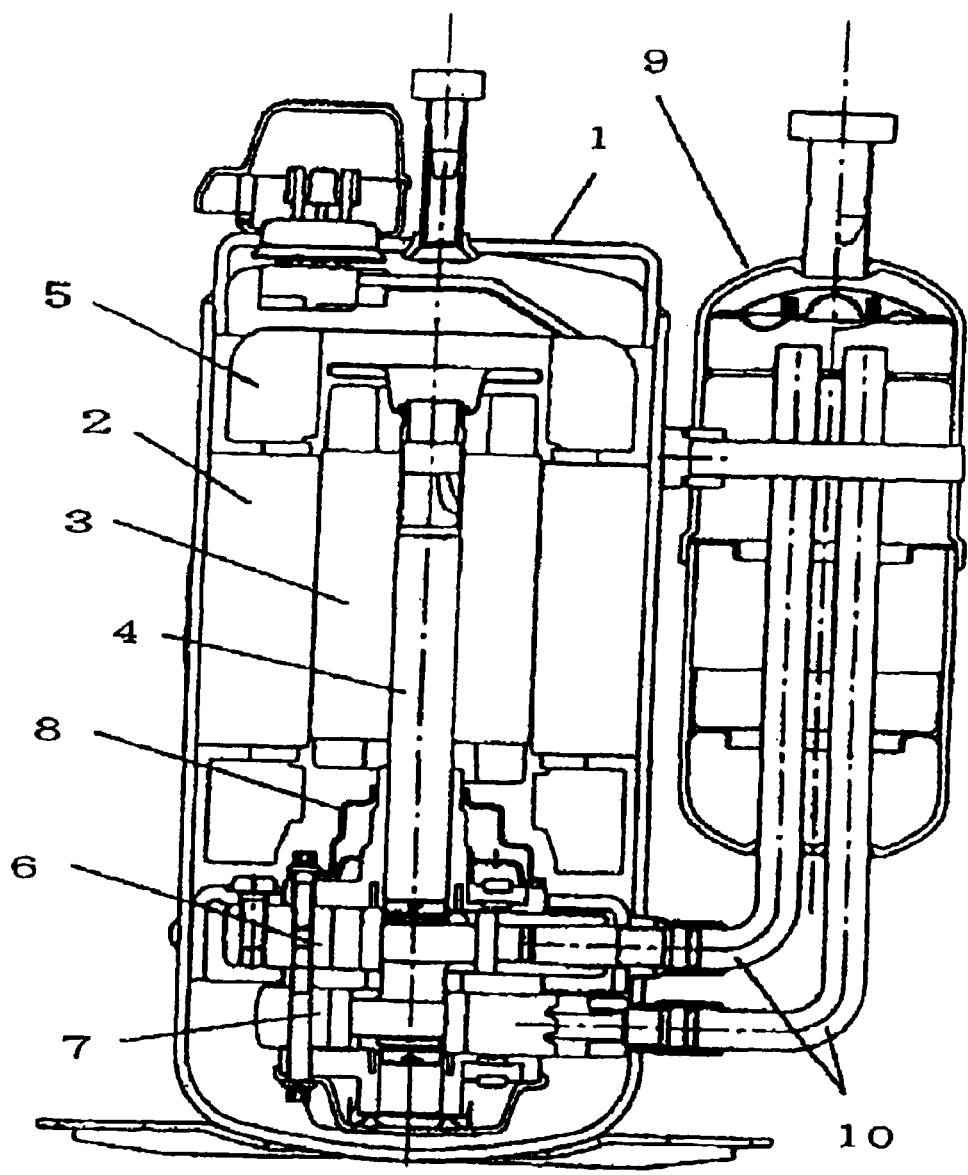

LUBRICANT FOR COMPRESSION REFRIGERATING MACHINE AND REFRIGERATING APPARATUS USING THE SAME

TECHNICAL FIELD

The present invention relates to a lubricating oil for a compression type refrigerator, and more particularly to, a lubricating oil for a compression type refrigerator using a natural refrigerant, and a refrigeration unit using the same.

BACKGROUND ART

Up to now, refrigerators such as those having a compression-refrigerating cycle of a compressor, a condenser, an expansion valve, and an evaporator use CFC (chlorofluorocarbon) and HCFC (hydrochlorofluorocarbon) as their refrigerants. In addition, many kinds of lubricating oil have been produced and employed in combination with such refrigerants.

However, concerns are that the chlorofluorocarbon compounds, which have been conventionally used as refrigerants, may destroy the ozone layer when the chlorofluorocarbon compounds are discharged into the atmosphere and cause environmental pollution problems.

In recent years, for measures against the environmental pollution, HFCs (hydrofluorocarbons), which may be alternatives for the chlorofluorocarbon compounds, have been developed. A variety of so-called fron substitutes including 1,1,1,2-tetrafluoroethane (R-134a) with a little fear of environmental pollution have become commercially available.

However, concerns arise that the above-mentioned HFCs also cause global warming problems. Thus, use of natural refrigerants without such problems and the like have been considered.

On the other hand, studies on carbon dioxide ($CO_2$), ammonia, and hydrocarbon gas have been made as natural refrigerants which substantially do not contribute to destruction of the ozone layer and global warming and will be provided as refrigerants in near feature.

For example, carbon dioxide ($CO_2$) is harmless for the environment and excellent from the viewpoint of safety for human, as well as having advantages of, for example, (i) its pressure almost at the optimal economical level; (ii) an extremely small pressure ratio, compared with that of the conventional refrigerant; (iii) an excellent adaptability to normal oil and structural materials of a machine; (iv) being available all over the place without any difficulty; and (v) extremely low price without the need of recovery. In addition, carbon dioxide has been used as refrigerants for some of the conventional refrigerators and the applications thereof as refrigerants for car air conditioners and heat pumps for hot water have been investigated in recent years.

Typically, for example, a compression type refrigerator contains at least a compressor, a condenser, an expansion mechanism (e.g., an expansion valve), and an evaporator. In such a lubricating oil for a compression type refrigerator, a liquid mixture of refrigerator lubricating oil and a refrigerant circulates in this closed system.

In the compression type refrigerator, although it depends on the kind of the apparatus, the inside of the compressor reaches a high temperature and the inside of the refrigerating chamber reaches a low temperature in general. Thus, both the refrigerant and the lubricating oil should circulate in the system without causing phase separation within a wide temperature range from low to high temperatures.

In general, a temperature region in which the refrigerant and the lubricating oil are miscible, i.e., not phase-separated, is preferably in the ranges of −20° C. or less and 0° C. or more, more preferably in the range of 10° C. or more on the higher temperature range.

If the phase separation occurs in the refrigerator at work, it will have a significantly adverse effect on the life or efficiency of the apparatus.

For example, when the phase separation of the refrigerant and the lubricating oil occurs at a compressor part, it leads to insufficient lubrication in a moving part and causes seizure or the like, thereby significantly shortening the life of the apparatus. On the other hand, when the phase separation occurs in the evaporator, it leads to a decrease in heat exchange efficiency due to the presence of high viscous lubricating oil.

The lubricating oil for a compression type refrigerator is employed for lubricating the moving part of the refrigerator, so its lubrication property is obviously considered to be also important.

In particular, the inside of the compressor becomes a high temperature, so it can be important for the lubricating oil to have a viscosity enough to retain an oil film to be required for lubrication.

The required viscosity of lubricating oil varies depending on the kind of the compressor to be used and the use conditions thereof. In general, however, the viscosity (kinematic viscosity) of lubricating oil yet to be mixed with the refrigerant is preferably 1 to 50 $mm^2/s$, particularly preferably 5 to 20 $mm^2/s$ at 100° C.

If the viscosity is lower than the defined value, a resulting oil film is thin and tends to cause insufficient lubrication. In contrast, if the viscosity is higher than the defined value, the heat exchange efficiency may be reduced.

On the other hand, like a car air-conditioner, when it is designed for use in cold regions, the viscosity of lubricating oil should not be too high at low temperatures to ensure its ability of allowing the apparatus to be initiated. Therefore, the lubricating oil requires a lower pour point and a higher viscosity index.

In general, the lubricating oil is required to have a pour point of −20° C., preferably −30° C. or less, more preferably −40° C. or less and a viscosity index of at least 80 or more, preferably 100 or more, more preferably 120 or more.

Further, the refrigerator oil requires various characteristics including lubricity and hydrolytic stability, as well as refrigerant miscibility and low-temperature fluidity.

However, the characteristics of the refrigerator oil are easily affected by the kind of the refrigerant. When the refrigerator oil for a chlorofluorocarbon refrigerant, which has been commonly used up to now is employed together with a natural refrigerant such as a carbon dioxide refrigerant, it is difficult to satisfy many characteristics that are required.

The development of novel refrigerator oil suitable for use with natural refrigerants, in particular, carbon-dioxide refrigerants, has been progressed. Polyalkylene glycol (PAG) has comparatively high miscibility to the carbon-dioxide refrigerant and is also excellent in low-temperature fluidity and hydrolytic stability, so it has drawn attention as one of substrates of refrigerator oil for carbon-dioxide refrigerants (see, for example, Patent Document 1).

The conventional PAG refrigerator oil described above shows miscibility to the carbon-dioxide refrigerator in a composition with a low proportion of the carbon-dioxide refrigerant, but the range of miscibility is not always sufficient.

Therefore, there is a method for preparing PAG with low viscosity to provide such refrigerator oil with sufficient refrigerant miscibility. In this case, however, it tends to fall in a vicious cycle of being insufficient in lubricity and stability.

Patent Document 1: Japanese Patent Application Laid-Open (kokai) No. 10-46169

DISCLOSURE OF THE INVENTION

The present invention have been accomplished in such circumstances. An object of the present invention is to provide a lubricating oil for a compression type refrigerator having high miscibility and high viscosity index, and excellent in wear resistance and storage stability under natural refrigerant atmosphere, in particular, under carbon dioxide atmosphere, and to provide a refrigeration unit using the lubricating oil.

As a result of intensive studies for developing lubricating oil for the compression type refrigerator having preferable characteristics as described above, the inventors of the present invention have found that lubricating oil containing as a primary component an ether compound with a specific structure and an organic carboxylic acid alkali metal salt can solve the above-mentioned problems.

In other words, the present invention provides:

(1) A lubricating oil for a compression type refrigerator, comprising:

a polyvinyl ether-based compound containing an alkylene glycol or polyoxyalkylene glycol unit and a vinyl ether unit in a molecule and having a molecular weight in a range of 300 to 3,000 and an organic carboxylic acid alkali metal salt.

(2) A lubricating oil for a compression type refrigerator, comprising:

a polyvinyl ether-based compound having a molecular weight in the range of 300 to 3,000, obtained by polymerizing vinyl ether-based compounds in the presence of a polymerization initiator and an organic carboxylic acid alkali metal salt, wherein at least one of the polymerization initiator and the vinyl ether-based compound comprises an alkylene glycol residue or a polyoxyalkylene glycol residue.

(3) A refrigeration unit, comprising:

a compression type refrigerator for a natural refrigerant, which includes at least a compressor, a condenser, an expansion mechanism, and an evaporator;

a natural refrigerant; and the lubrication oil for a compression type refrigerator according to the above-mentioned (1) or (2).

The lubricating oil of the present invention is excellent in miscibility to a natural refrigerant as a refrigerant, and in lubricating properties, in particular, wear resistance and storage stability, so the lubricating oil of the present invention can be used as a lubricating oil for a compression type refrigerator that uses a natural refrigerant.

In addition, the lubricating oil of the present invention can be employed for a lubricating oil for a compression type refrigerator that uses a mixture refrigerant including a natural refrigerant such as carbon dioxide.

Further, in order to improve miscibility to a refrigerant, the lubricating oil of the present invention can be employed by mixing in other lubricating oils for a compression type refrigerator, such as an ester compound, a polycarbonate compound, a mineral oil, an alkylbenzene, a poly-α-olefin.

BRIEF DESCRIPTION OF THE DRAWING

FIG. 1 is a vertical cross-sectional diagram of a main part of an example of a compression type refrigerator in the refrigeration unit of the present invention.

DESCRIPTION OF SYMBOLS

1: case
2: stator
3: motor roller
4: rotation shaft
5: winding part
6: upper compression chamber
7: lower compression chamber
8: muffler
9: accumulator
10: suction pipe

BEST MODE FOR CARRYING OUT THE INVENTION

The lubricating oil for a compression type refrigerator (hereinafter, referred to simply as "lubricating oil") of the present invention has two aspects. That is:

(1) A lubricating oil I, comprising:

a polyvinyl ether-based compound containing an polyalkylene glycol or polyoxyalkylene glycol unit and a polyvinyl ether unit in a molecule and having a molecular weight in a range of 300 to 3,000 and an organic carboxylic acid alkali metal salt; and (2) A lubricating oil II, comprising:

a polyvinyl ether-based compound having a molecular weight in the range of 300 to 3,000, obtained by polymerizing vinyl ether-based compounds in the presence of a polymerization initiator and an organic carboxylic acid alkali metal salt wherein at least one of the polymerization initiator and the vinyl ether-based compound comprises an alkylene glycol residue or a polyoxyalkylene glycol residue.

In the present invention, examples of lubricating oil that meets the above-mentioned lubricating oil I or II include lubricating oil comprising polyvinyl ether-based compounds 1 to 4 described below.

[Polyvinyl Ether-Based Compound 1]

Polyvinyl ether-based compound 1 is an ether compound having a constitutional unit represented by the general formula (I):

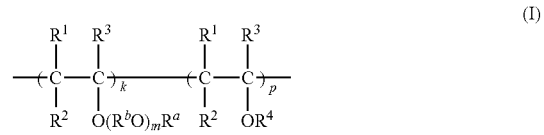

wherein $R^1$, $R^2$, and $R^3$ each represent a hydrogen atom or a hydrocarbon group having 1 to 8 carbon atoms, which may be identical to or different from one another; $R^b$ represents a divalent hydrocarbon group having 2 to 4 carbon atoms; $R^a$ represents a hydrogen atom, an aliphatic or alicyclic hydrocarbon group having 1 to 20 carbon atoms, an aromatic group which has 1 to 20 carbon atoms and may have a substituent, an acyl group having 2 to 20 carbon atoms, or an oxygen-containing hydrocarbon group having 2 to 50 carbon atoms; $R^4$ represents a hydrocarbon group having 1 to 10 carbon atoms; when plural $R^a$s, $R^b$s, and $R^4$s are present, they may be identical to or different from one another; m represents an average value of 1 to 50; k represents a number of 1 to 50; p represents a number of 0 to 50; and when plural ks and ps are present, units may be in block or in random.

Further, when plural $R^b$Os are present, they may be identical to or different from one another.

Here, specific examples of the hydrocarbon group having 1 to 8 carbon atoms represented by each of $R^1$, $R^2$, and $R^3$ include: alkyl groups such as a methyl group, an ethyl group, a n-propyl group, an isopropyl group, a n-butyl group, an isobutyl group, a sec-butyl group, a tert-butyl group, various pentyl groups, various hexyl groups, various heptyl groups, and various octyl groups; cycloalkyl groups such as a cyclopentyl group, a cyclohexyl group, various methylcyclohexyl groups, various ethylcyclohexyl groups, and various dimethylcyclohexyl groups; aryl groups such as a phenyl group, various methylphenyl groups, various ethylphenyl groups, and various dimethylphenyl groups; and arylalkyl groups such as a benzyl group, various phenylethyl groups, and various methylbenzyl groups.

Each of $R^1$, $R^2$, and $R^3$ particularly preferably represents a hydrogen atom.

On the other hand, specific examples of the divalent hydrocarbon group having 2 to 4 carbon atoms represented by $R^b$ include divalent alkylene groups such as a methylene group, an ethylene group, a propylene group, a trimethylene group, and various butylene groups.

In addition, m in the general formula (I) represents the number of repeats of $R^bO$ with an average value thereof in the range of 1 to 50, preferably 2 to 20, more preferably 2 to 10, particularly preferably 2 to 5.

When plural $R^bO$s are present, they may be identical to or different from one another.

Further, k represents 1 to 50, preferably 1 to 10, more preferably 1 to 2, particularly preferably 1, while p represents 0 to 50, preferably 2 to 25, more preferably 5 to 15. When plural ks and ps are present, units may be in block or in random.

Examples of the aliphatic or alicyclic hydrocarbon group having 1 to 20 carbon atoms represented by $R^a$ preferably include an alkyl group having 1 to 10 carbon atoms or a cycloalkyl group having 5 to 10 carbon atoms. Specific examples thereof include a methyl group, an ethyl group, a n-propyl group, an isopropyl group, a n-butyl group, an isobutyl group, a sec-butyl group, a tert-butyl group, various pentyl groups, various hexyl groups, various heptyl groups, various octyl groups, various nonyl groups, various decyl groups, a cyclopentyl group, a cyclohexyl group, various methylcyclohexyl groups, various ethylcyclohexyl groups, various propylcyclohexyl groups, and various dimethylcyclohexyl groups.

Specific examples of the aromatic group which has 1 to 20 carbon atoms and may have a substituent represented by $R^a$ include: aryl groups such as a phenyl group, various tolyl groups, various ethylphenyl groups, various xylyl groups, various trimethylphenyl groups, various butylphenyl groups, and various naphthyl groups; and arylalkyl groups such as a benzyl group, various phenylethyl groups, various methylbenzyl groups, various phenylpropyl groups, and various phenylbutyl groups.

In addition, examples of the acyl group having 2 to 20 carbon atoms represented by $R^a$ include an acetyl group, a propionyl group, a butyryl group, an isobutyryl group, a valeryl group, an isovaleryl group, a pivaloyl group, a benzoyl group, and a toluoyl group.

Further, specific examples of the oxygen-containing hydrocarbon group having 2 to 50 carbon atoms represented by $R^a$ preferably include a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, and a (1-methyl-2-methoxy)propyl group.

In the general formula (I), specific examples of the hydrocarbon group having 1 to 10 carbon atoms represented by $R^4$ include: alkyl groups such as a methyl group, an ethyl group, a n-propyl group, an isopropyl group, a n-butyl group, an isobutyl group, various pentyl groups, various hexyl groups, various heptyl groups, various octyl groups, various nonyl groups, and various decyl; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups such as a benzyl group, various phenylethyl groups, various methylbenzyl groups, various phenylpropyl groups, and various phenylbutyl groups.

Further, each of $R^1$ to $R^3$, $R^a$, $R^b$, m, and $R^1$ to $R^4$ may be identical to or different from one another in every constitutional unit.

The polyvinyl ether-based compound 1 can be obtained using as an initiator, for example, an alkylene glycol compound or a polyoxyalkylene glycol compound represented by the general formula (VI):

$$R^a-(OR^b)_m-OH \qquad (VI)$$

and polymerizing vinyl ether-based compounds represented by the general formula (VII):

$$\begin{array}{c} R^1-C=C-R^3 \\ | \quad \phantom{=} | \\ R^2 \quad OR^4 \end{array} \qquad (VII)$$

wherein $R^a$, $R^b$, and m and $R^1$ to $R^4$ are as explained above.

Specific examples of the alkylene glycol compound or the polyoxyalkylene glycol compound include: alkylene glycols such as ethylene glycol, ethylene glycol monomethyl ether, diethylene glycol, diethylene glycol monomethyl ether, triethylene glycol, triethylene glycol monomethyl ether, propylene glycol, propylene glycol monomethyl ether, dipropylene glycol, dipropylene glycol monomethyl ether, tripropylene glycol, and tripropylene glycol monomethyl ether; a polyoxyalkylene glycol; and a monoether compound thereof.

Examples of the vinyl ether-based compound represented by the general formula (VII) include: vinyl ethers such as vinyl methyl ether, vinyl ethyl ether, vinyl-n-propyl ether, vinyl-isopropyl ether, vinyl-n-butyl ether, vinyl-isobutyl ether, vinyl-sec-butyl ether, vinyl-tert-butyl ether, vinyl-n-pentyl ether, and vinyl-n-hexyl ether; propenes such as 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, and 2-tert-butoxypropene; and butenes such as 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, and 2-tert-butoxy-2-butene.

Those vinyl ether-based monomers can be produced by any known methods.

[Polyvinyl Ether-Based Compound 2]

Polyvinyl ether-based compound 2 is an ether compound having a constitutional unit represented by the general formula (II):

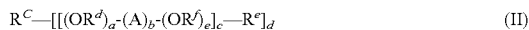

$$R^c\text{—}[[(OR^d)_a\text{-}(A)_b\text{-}(OR^f)_e]_c\text{—}R^e]_d \qquad (II)$$

In the general formula (II), $R^c$ represents a hydrogen atom, an alkyl group having 1 to 10 carbon atoms, an acyl group having 2 to 10 carbon atoms, or a hydrocarbon group having 1 to 10 carbon atoms and having 2 to 6 binding sites; $R^d$ and $R^f$ represent alkylene groups having 2 to 4 carbon atoms; a and e represent average values of 0 to 50; c represents an integer of 1 to 20; $R^e$ represents a hydrogen atom, an alkyl group having 1 to 10 carbon atoms, an alkoxy group having 1 to 10 carbon atoms, or an acyl group having 2 to 10 carbon atoms; and when a and/or e is 2 or more, $(OR^d)$ and/or $(OR^f)$ and (A) may be in random or in block.

(A) is represented by the general formula (III):

wherein $R^5$, $R^6$, and $R^7$ each represent a hydrogen atom or a hydrocarbon group having 1 to 8 carbon atoms, which may be identical to or different from one another; $R^8$ represents a divalent hydrocarbon group having 1 to 10 carbon atoms or a divalent hydrocarbon group containing ether-bonded oxygen and having 2 to 20 carbon atoms; $R^9$ represents a hydrogen atom or a hydrocarbon group having 1 to 20 carbon atoms; n represents an average value of 0 to 10; when plural ns are present, constitutional units may be identical to or different from one another; $R^5$ to $R^9$ may be identical to or different from one another in every constitutional unit; and when plural $R^8$Os are present, they may be identical to or different from one another. When b is 3 or more, d is an integer of 1 to 6, and a is zero (0), n in one of the constitutional units A represents an integer of 1 or more.

Examples of the alkyl group having 1 to 10 carbon atoms represented by each of the above-mentioned $R^c$ and $R^e$ include: alkyl groups such as a methyl group, an ethyl group, a n-propyl group, an isopropyl group, a n-butyl group, an isobutyl group, various pentyl groups, various hexyl groups, various heptyl groups, various octyl groups, various nonyl groups, and various decyl; a cyclopentyl group; a cyclohexyl group; various methylcyclohexyl groups; various ethylcyclohexyl groups; various propylcyclohexyl groups; and various dimethylcyclohexyl groups. Examples of the acyl group having 2 to 10 carbon atoms include an acetyl group, a propionyl group, a butyryl group, an isobutyryl group, a valeryl group, an isovaleryl group, a pivaloyl group, a benzoyl group, and a toluoyl group.

Examples of the alkoxy group having 1 to 10 carbon atoms represented by $R^e$ include a methoxy group, an ethoxy group, a propoxy group, a butoxy group, a pentyloxy group, a hexyloxy group, a heptyloxy group, an octyloxy group, a nonyloxy group, and a decyloxy group.

Examples of the hydrocarbon group having 1 to 10 carbon atoms and having 2 to 6 binding sites represented by $R^c$ include residues obtained by removing hydroxy groups from polyhydric alcohols such as ethylene glycol, diethylene glycol, propylene glycol, dipropylene glycol, polypropylene glycol, neopentyl glycol, trimethylolethane, trimethylolpropane, glycerine, ditrimethylolpropane, diglycerine, pentaerythritol, dipentaerythritol, and sorbitol.

Example of the alkylene group having 2 to 4 carbon atoms represented by $R^d$ include an ethylene group, a propylene group, a trimethylene group, and various butylene groups.

In the general formula (III), examples of the hydrocarbon group having 1 to 8 carbon atoms represented by each of $R^5$ to $R^7$ include: alkyl groups such as a methyl group, an ethyl group, a n-propyl group, an isopropyl group, a n-butyl group, an isobutyl group, various pentyl groups, various hexyl groups, various heptyl groups, and various octyl groups; cycloalkyl groups such as a cyclopentyl group, a cyclohexyl group, various methylcyclohexyl groups, various ethylcyclohexyl groups, and various dimethylcyclohexyl groups; aryl groups such as a phenyl group, various methylphenyl groups, various ethylphenyl groups, and various dimethylphenyl groups; and arylalkyl groups such as a benzyl group, various phenylethyl groups, and various methylbenzyl groups.

Each of $R^5$, $R^6$, and $R^7$ particularly preferably represents a hydrogen atom.

Specific examples of the divalent hydrocarbon group having 1 to 10 carbon atoms represented by $R^8$ include: divalent aliphatic groups such as a methylene group, an ethylene group, a phenylethylene group, a 1,2-propylene group, a 2-phenyl-1,2-propylene group, a 1,3-propylene group, various butylene groups, various pentylene groups, various hexylene groups, various heptylene groups, various octylene groups, various nonylene groups, and various decylene groups; alicyclic groups each having two biding sites on alicyclic hydrocarbon, such as cyclohexane, methylcyclohexane, ethylcyclohexane, dimethylcyclohexane, and propylcyclohexane; divalent aromatic hydrocarbon groups such as various phenylene groups, various methylphenylene groups, various ethylphenylene groups, various dimethylphenylene groups, and various naphthylene groups; alkyl aromatic groups each having a monovalent biding site on each of an alkyl group portion and an aromatic group portion of an alkyl aromatic hydrocarbon, such as toluene, xylene, or ethylbenzene; and alkyl aromatic groups each having a binding site on an alkyl group portion of a polyalkyl aromatic hydrocarbon such as xylene and diethylbenzene.

Of those, the aliphatic groups having 2 to 4 carbon atoms are particularly preferable.

In addition, specific examples of the divalent hydrocarbon group containing ether-bonded oxygen and having 2 to 20 carbon atoms represented by $R^8$ preferably include a methoxymethylene group, a methoxyethylene group, a methoxymethylethylene group, a 1,1-bismethoxymethylethylene group, a 1,2-bismethoxymethylethylene group, an ethoxymethylethylene group, a (2-methoxyethoxy)methylethylene group, and a (1-methyl-2-methoxy)methylethylene group.

Further, specific examples of the hydrocarbon group having 1 to 20 carbon atoms represented by $R^9$ include: alkyl groups such as a methyl group, an ethyl group, a n-propyl group, an isopropyl group, a n-butyl group, an isobutyl group, a sec-butyl group, a tert-butyl group, various pentyl groups, various hexyl groups, various heptyl groups, various octyl groups, various nonyl groups, and various decyl groups; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups such as a benzyl group, various phenylethyl groups, various methylbenzyl groups, various phenylpropyl groups, and various phenylbutyl groups.

Polyvinyl compound 2 represented by the above-mentioned general formula (II) may be preferably one in which $R^c$ is a hydrogen atom, a=0, c=1, and d=1 or one in which $R^e$ is a hydrogen atom, e=0, and c=1, or one that satisfies both of them in terms of the characteristics thereof as lubricating oil.

Further, preferable is one in which each of $R^5$ to $R^7$ is a hydrogen atom, n has an average value of 0 to 4 and any one of n is one or more, and $R^8$ is a hydrocarbon group having 2 to 4 carbon atoms.

[Polyvinyl Ether-Based Compound 3]

Polyvinyl ether-based compound 3 is an ether compound having a structure represented by the general formula (IV):

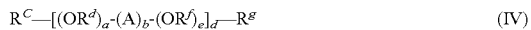  (IV)

In the general formula (IV), each of $R^c$, $R^d$, $R^f$, A, a, b, d, and e is the same as each of the general formula (II); and $R^g$ represents a hydrogen atom, an alkyl group having 1 to 10 carbon atoms, an alkoxy group having 1 to 10 carbon atoms, an acyl group having 2 to 10 carbon atoms, or a hydrocarbon group having 1 to 10 carbon atoms and having 2 to 6 binding sites; and when a and/or e is 2 or more, $OR^d$ and/or $OR^f$ and A may be in random or in block.

When each of a and e is zero (0), n represents an integer of 1 or more in one of the constitutional units A.

Examples of the alkylene group having 2 to 4 carbon atoms represented by $R^f$ include an ethylene group, a propylene group, a trimethylene group, and various butylene groups.

In $R^g$, the alkyl group having 1 to 10 carbon atoms, the acyl group having 2 to 10 carbon atoms, and the hydrocarbon groups having 1 to 10 carbon atoms and having 2 to 6 binding sites may be the same groups as those exemplified in the description about $R^c$ in the general formula (II).

Further, in $R^g$, the alkoxy group having 1 to 10 carbon atoms may be the same groups as those exemplified in the description about $R^e$ in the general formula (II).

Polyvinyl ether-based compound 3 represented by the above-mentioned general formula (IV) may be preferably one in which $R^c$ is a hydrogen atom and a=0, one in which $R^g$ is a hydrogen atom, d=1, and e=0, or one that satisfies both of them.

Further, preferable is one in which each of $R^5$ to $R^7$ is a hydrogen atom, n has an average value of 0 to 4 and any one of n is one or more, and $R^8$ is a hydrocarbon group having 2 to 4 carbon atoms.

[Polyvinyl Ether-Based Compound 4]

Polyvinyl ether-based compound-based 4 is a block or random copolymer having (a) a constitutional unit represented by the above-mentioned general formula (III) and (b) a constitutional unit represented by the general formula (V):

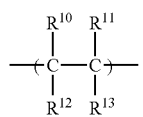  (V)

wherein $R^{10}$ to $R^{13}$ each represent a hydrogen atom or a hydrocarbon group having 1 to 20 carbon atoms, which may be identical to or different from one another; and $R^{10}$ to $R^{13}$ may be identical to or different from one another in every constitutional unit.

In the general formula (V), among $R^{10}$ to $R^{13}$, the hydrocarbon group having 1 to 20 carbon atoms may be the same group as one exemplified in the description about $R^9$ in the above-mentioned general formula (III).

The polyvinyl ether-based compound 4 can be produced by copolymerizing, for example, a vinyl ether-based monomer represented by the general formula (VIII):

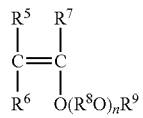  (VIII)

wherein $R^5$ to $R^9$ and n are identical with those described above, and a hydrocarbon monomer having an olefinic double bond represented by the general formula (IX):

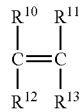  (IX)

wherein $R^{10}$ to $R^{13}$ are identical with those described above.

Examples of the vinyl ether-based monomer represented by the general formula (VIII) include: vinyl ethers such as vinyl methyl ether, vinyl ethyl ether, vinyl-n-propyl ether, vinyl-isopropyl ether, vinyl-n-butyl ether, vinyl-isobutyl ether, vinyl-sec-butyl ether, vinyl-tert-butyl ether, vinyl-n-pentyl ether, vinyl-n-hexyl ether, vinyl-2-methoxyethyl ether, vinyl-2-ethoxyethyl ether, vinyl-2-methoxy-1-methylethyl ether, vinyl-2-methoxy-2-methyl ether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, and vinyl-2,6,9-trioxa-4-decyl ether; propenes such as 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, and 2-tert-butoxypropene; and butenes such as 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, and 2-tert-butoxy-2-butene.

Those vinyl ether-based monomers can be produced by any known methods.

On the other hand, examples of the hydrocarbon monomer having an olefinic double bond represented by the general formula (IX) include ethylene, propylene, various butenes, various pentenes, various hexenes, various heptenes, various octenes, diisobutylene, triisobutylene, styrene, and various alkyl-substituted styrenes.

In the present invention, the above-mentioned polyvinyl ether-based compounds 1 to 4 can be produced by radical polymerization, cationic polymerization, radiation polymerization, or the like of the corresponding vinyl ether-based compounds and optionally hydrocarbon monomers each having an olefinic double bond.

For example, a polymerization product of the vinyl ether-based monomers having a desired viscosity can be obtained through polymerization by a method described below.

For initiating the polymerization, any of combinations of Broensted acids, Lewis acids, or organic metal compounds with adducts of carboxylic acid with water, alcohols, phenols, acetals, or vinyl ethers can be used.

Examples of the Broensted acids include hydrofluoric acid, hydrochloric acid, hydrobromic acid, hydroiodic acid, nitric acid, sulfuric acid, trichloroacetic acid, and trifluoroacetic acid.

Examples of the Lewis acids include borontrifluoride, aluminum trichloride, aluminum tribromide, tin tetrachloride, zinc dichloride, and ferric chloride. Of those Lewis acids, boron trifluoride is particularly preferable.

In addition, examples of the organic metal compounds include diethyl aluminum chloride, ethyl aluminum chloride, and diethyl zinc.

The adducts of water, alcohols, phenols, acetals, or vinyl ethers with carboxylic acid to be combined with the compounds can be optionally selected.

Here, examples of the alcohols include: saturated aliphatic alcohols having 1 to 20 carbon atoms, such as methanol, ethanol, propanol, isopropanol, butanol, isobutanol, sec-butanol, tert-butanol, various pentanols, various hexanols, various heptanols, and various octanols; unsaturated aliphatic alcohols having 3 to 10 carbon atoms such as allyl alcohol; and monoethers of alkylene glycols, such as ethylene glycol monomethyl ether, diethylene glycol monomethyl ether, triethylene glycol monomethyl ether, propylene glycolmonomethyl ether, dipropylene glycol monomethyl ether, and tripropylene glycol monomethyl ether.

Examples of the carboxylic acids when adducts thereof with vinyl ethers are used include acetic acid, propionic acid, n-butyric acid, isobutyric acid, n-valeric acid, isovaleric acid, 2-methylbutyric acid, pivalic acid, n-caproic acid, 2,2-dimethyl butyric acid, 2-methylvaleric acid, 3-methylvaleric acid, 4-methyl valeric acid, enanthic acid, 2-methyl caproic acid, caprylic acid, 2-ethyl caproic acid, 2-n-propyl valeric acid, n-nonanoic acid, 3,5,5-trimethyl caproic acid, caprylic acid, and undecanoic acid.

The vinyl ethers when adducts thereof with carboxylic acids are used may be identical with those used in polymerization or may be different.

The adducts of the vinyl ethers with the carboxylic acid can be obtained by mixing and reacting them at a temperature of about 0 to 100° C., and they can be separated by distillation or the like and then used for a reaction. Alternatively, it may be directly used for a reaction without separation.

When any of water, alcohols, or phenols are used, a hydrogen atom binds to the end of the polymer for polymerization initiation. In contrast, when acetal is used, a hydrogen atom or one of alkoxy groups of the acetal used can be detached.

In addition, when an adduct of vinyl ether with carboxylic acid is used, an alkyl carbonyloxy group originated from a carboxylic acid portion is detached from the adduct of the vinyl ether with the carboxylic acid.

On the other hand, when any of water, alcohols, phenols, and acetals is used, the end of the polymer for terminating the polymerization becomes acetal, olefin, or aldehyde.

In addition, in the case of an adduct of vinyl ether with carboxylic acid, it becomes carboxylic acid ester of hemiacetal.

The ends of the polymer thus obtained can be converted into desired groups by a method known in the art.

Examples of the desired groups include residues such as saturated hydrocarbon, ether, alcohol, ketone, nitrile, and amide. Of those, the residues such as saturated hydrocarbon, ether, and alcohol are preferable.

The polymerization of vinyl ether-based monomers represented by the general formula (VIII) can be initiated at a temperature ranging from −80 to 150° C., usually from −80 to 50° C., depending on the kinds of raw materials and initiators.

In addition, the polymerization reaction can be completed within about 10 seconds to 10 hours after initiation of the reaction.

As for controlling the molecular weight of the polymer, a polymer having a low average molecular weight can be obtained by increasing the amount of an adduct of carboxylic acid with water, alcohols, phenols, acetals, and vinyl ethers with respect to the vinyl ether-based monomers represented by the general formula (VIII).

Further, a polymer having a low average molecular weight can be obtained by increasing the amount of the Broensted acid or Lewis acid.

This polymerization reaction is usually performed in the presence of a solvent.

The solvent may be any of solvents that dissolve the amounts of reaction raw materials required and are inert to the reaction. Examples thereof which can be preferably used include, but not particularly limited to: hydrocarbon solvents such as hexane, benzene, and toluene; and ether solvents such as ethyl ether, 1,2-dimethoxyethane, and tetrahydrofuran.

Further, this polymerization reaction can be terminated by the addition of alkali.

After completion of the polymerization reaction, if required, common separation and purification procedures may be carried out to obtain a polyvinyl ether-based compound of interest.

The polyvinyl ether-based compound to be included in each of lubricating oil I and II of the present invention may preferably have a carbon/oxygen molar ratio of 4 or less. If the molar ratio exceeds 4, the miscibility of a lubricating oil to a natural refrigerant such as carbon dioxide decreases.

As for adjustment of the molar ratio, the adjustment of a carbon/oxygen molar ratio of a raw material monomer can lead to the production of a polymer having such a molar ratio within the above-mentioned range.

In other words, the larger the percentage of a monomer having a high carbon/oxygen molar ratio is, the higher the carbon/oxygen ratio of the polymer obtained is. In contrast, the larger the percentage of monomer having a low carbon/oxygen molar ratio is, the lower the carbon/oxygen ratio of obtained polymer is.

As mentioned in the method of polymerizing the vinyl ether-based monomers, the adjustment of the carbon/oxygen molar ratio may be attained by any of combinations of monomers with adducts, which are used as initiators, of carboxylic acid with water, alcohols, phenols, acetals, and vinyl ethers.

When any of alcohols, phenols, and the like having carbon/oxygen molar ratios larger than those of monomers to be polymerized is used as an initiator, a polymer having a carbon/oxygen ratio larger than those of raw material monomers can be obtained. In contrast, when any of alcohols having smaller carbon/oxygen molar ratios, such as methanol and methoxy ethanol, is used, a polymer having a carbon/oxygen ratio smaller than those of raw material monomers can be obtained.

Further, when a vinyl ether-based monomer is copolymerized with a hydrocarbon monomer having an olefinic double bond, a polymer having a carbon/oxygen molar ratio larger than that of the vinyl ether-based monomer can be obtained. In this case, the ratio can be adjusted with the percentage of the hydrocarbon monomer having an olefinic double bond to be used or with the number of carbon atoms thereof.

The lubricating oil for a compression type refrigerator of the present invention comprises the above-mentioned polyvinyl ether-based compound in an amount of preferably 70% by mass or more, more preferably 80% by mass or more, still more preferably 90% by mass or more, particularly preferably 100% by mass.

For the vinyl ether-based compound, any one of vinyl ether-based compounds may be used alone or two or more of them may be used in combination.

The kind of base oil for lubricating oil other than the polyvinyl ether-based compound, which can be used in a percentage of 30% by mass or less in combination, is not particularly limited.

For the lubricating oil of the present invention, a kinematic viscosity thereof yet to be mixed with a refrigerant is preferably in the range of 1 to 50 mm$^2$, particularly preferably in the range of 5 to 25 mm$^2$ at 100° C.

In addition, it has a viscosity index of preferably 80 or more, more preferably 90 or more, still more preferably 100 or more.

Further, it is preferable that the lubricating oil of the present invention has a carbon/oxygen molar ratio of 4 or less. If the molar ratio exceeds 4, the miscibility thereof to carbon dioxide decreases.

The lubricating oil for a compression type refrigerator of the present invention includes an organic carboxylic acid alkali metal salt.

Examples of the organic carboxylic acid include an aliphatic saturated monocarboxylic acid having 8 to 20 carbon atoms, an aliphatic unsaturated carboxylic acid, an aliphatic dicarboxylic acid, and an aromatic carboxylic acid.

Preferable is a carboxylic acid having 12 to 18 carbon atoms, and more preferable is an unsaturated carboxylic acid having 12 to 18 carbon atoms.

Specific examples of the organic carboxylic acid are as described below.

Examples of the aliphatic saturated monocarboxylic acid include: straight-chain saturated acids such as caprylic acid, capric acid, lauric acid, myristic acid, palmitic acid, stearic acid, and icosanoic acid; and branched aliphatic acids such as 2,2-dimethylheptanoic acid, 2-ethylhexanoic acid, dimethyl hexanoicacid, 2-n-propyl-pentanoic acid, 3,5,5-trimethylhexanoic acid, dimethyloctanoicacid, isotridecanoicacid, isomyristicacid, isostearic acid, isoarachic acid, and isohexanoic acid.

In addition, examples of the unsaturated carboxylic acid include palmitoleic acid, oleic acid, elaidic acid, linoic acid, and linolenic acid.

Examples of the aliphatic dicarboxylic acid include azelaic acid and sebacic acid, and examples of the aromatic carboxylic acid include phthalic acid, trimellitic acid, and pyromellitic acid.

Examples of the alkali metal include lithium, sodium, and potassium.

Specific examples of the organic carboxylic acid alkali metal salt include lithium laurate, sodium oleate, and potassium oleate.

The organic carboxylic acid alkali metal salt may be used alone or two or more of them may be used in combination.

The blending amount of the organic carboxylic acid alkali metal salt in the lubricating oil for compression type refrigerator of the present invention is generally 0.001 to 5% by mass, preferably 0.001 to 1% by mass, more preferably 0.001 to 0.1 by mass.

When the blending amount of the organic carboxylic acid alkali metal salt is in the above range, wear resistance in particular can be improved and also excellent storage stability can be obtained.

In the present invention, a dissolving assistant of the organic carboxylic acid alkali metal salt can be used.

Specific examples of the dissolving assistant include ethylene glycol, diethylene glycol, triethylene glycol, tetraethylene glycol, propylene glycol, dipropylene glycol, 1,4-butylene glycol, 2,3-butylene glycol, hexylene glycol, octylene glycol, glycerin glycols, and polyhydric alcohols.

The blending amount of the dissolving assistant may be generally about 5- to 100-fold by mass based on the amount by mass of the organic carboxylic acid alkali metal salt.

In addition, to the lubricating oil for a compression type refrigerator of the present invention, various additives other than the organic carboxylic acid alkali metal salt of the present invention can be added appropriately as required. Examples of the various additives include a loading resistance additive, an extreme-pressure agent, a lubricity improving agent such as an oiliness agent, an acid scavenger, an antioxidant, a metal deactivator, a detergent dispersant, a viscosity index improver, a rust inhibitor, a corrosion inhibitor, a pour point depressant, and an anti-foaming agent.

Examples of the lubricity improving agents which can be used, include: those based on organosulfur compounds, such as monosulfides, polysulfides, sulfoxides, sulfones, thiosulfinates, sulfurized fat and oil, thiocarbonates, thiophenes, thiazoles, and methanesulfonic esters; those based on phosphorus compounds such as phosphate esters, phosphite, phosphate amine salts, phosphate metal salts, and organic phosphonic esters; those based on thiophosphoric acid esters, such as thiophosphoric acid triesters; those based on fatty acid esters, such as higher fatty acids, hydroxyaryl fatty acids, polyhydric alcohol esters, carboxylic acid-containing polyhydric alcohol esters, and acrylate esters; those based on organic chlorides, such as chlorinated hydrocarbons and chlorinated carboxylic acid derivatives; those based on organic fluorides, such as fluorinated aliphatic carboxylic acids, fluorinated ethylene resins, fluorinated alkyl polysiloxanes, and fluorinated graphite; those based on alcohols, such as higher alcohol; and those based on metal compounds, such as thiophosphates (dialkyl zinc phosphorodithioate), thiocarbamate, organomolybdenum compounds, organotin compounds, organogermanium compounds, and boric acid esters.

Examples of the acid scavengers, which can be used, include compounds containing glycidyl ether groups, α-olefin oxides, epoxylated aliphatic acid monoesters, epoxylated fat and oil, and compounds containing epoxycycloalkyl groups.

Examples of the antioxidants, which can be used, include phenols (2,6-di-tertiary-butyl-p-cresol) and aromatic amines (α-naphthyl amine).

Examples of the metal deactivators include benzotriazole derivatives.

Examples of the anti-foaming agents include silicone oil (dimethyl polysiloxane) and polymethacrylates.

Examples of the detergent dispersant, which can be used, include sulfonates, phenates, and succinate imides.

Examples of the viscosity index improvers, which can be used, include polymethacrylates, polyisobutylenes, ethylene-propylene copolymers, and hydrogenated styrene-diene copolymers.

The blending amount of each of those additives is typically in the range of about 0.01 to 5% by mass with reference to the total amount of the lubricating oil for compression type refrigerator of the present invention.

Further, the lubricating oil of the present invention is suitable for natural refrigerants.

Examples of the natural refrigerants include a carbon dioxide ($CO_2$) refrigerant, an ammonia refrigerant, and a hydrocarbon refrigerant.

Examples of the hydrocarbon refrigerant include isobutane, n-butane, and propane, and a mixture thereof.

The lubricating oil of the present invention is excellent in lubrication property as well as miscibility to a carbon-dioxide refrigerant. In particular, therefore, it is suitably used as a lubricating oil of a system for circulating a carbon dioxide compression type refrigerant.

Further, in the present invention, each of the mixture refrigerants of the respective natural refrigerants and each mixture of various HFC refrigerants and the respective natural refrigerants or a mixture thereof as described above may be used. In addition, mixture refrigerants of the above-mentioned natural refrigerants with HFC refrigerants, fluorine-containing ether refrigerants, and fluorine-free refrigerants such as dimethyl ethers may be also used.

Herein, as HFC refrigerants, R134a, R410A, R404A, R407c are exemplified.

Next, the refrigeration unit of the present invention is constructed of a system for circulating a compression type refrigerant. The system includes at least a compressor, a condenser, an expansion mechanism (e.g., an expansion valve), and an evaporator. Alternatively, the system essentially includes a compressor, a condenser, an expansion mechanism, a drier, and an evaporator. The refrigeration unit of the present invention preferably uses a natural refrigerant such as carbon dioxide, and the lubricating oil of the present invention as lubricating oil (refrigerator oil).

Here, the drier is preferably filled with a desiccating agent consisting of zeolite with a pore diameter of 3.5 Å or less.

In addition, the zeolite may be natural zeolite or synthetic zeolite.

In the present invention, the use of such a desiccating agent can efficiently remove moisture without absorbing a refrigerant during the period of a refrigerating cycle and simultaneously prevent powderization of the desiccating agent due to its degradation. Therefore, there is no possibility of causing blockage of a pipe arrangement caused by the powderization of the desiccating agent, abnormal wear due to the invasion of the powder into a sliding part of the compressor, or the like thereby allowing the refrigeration unit to be stably driven for a long period of time.

Further, the refrigeration unit of the present invention constitutes a circulation system as a refrigerating cycle in the refrigeration unit such as a closed compressor of a high- or low-internal pressure type, in which both a compressor and an electric motor are covered with a common cover, or may be an opened or semi-closed compressor or a canned-motor compressor, in which a driving part of the compressor is placed outside.

In any of the types described above, it is preferable that the winding of a stationary part of an electric motor (motor) has a core wire (e.g., a magnetic wire) covered with enamel having a glass transition temperature of 130° C. or more, or an enameled wire fixed with varnish having a glass transition temperature of 50° C. or more.

Further, the enamel covering is preferably of a single layer of polyester imide, polyimide, polyamide, or polyamide imide or of a multiple layer thereof.

In particular, an enamel covering, which is prepared by laminating a layer having a high glass transition temperature as an upper layer on a layer having a low glass transition temperature as a lower layer, is excellent in water resistance, softening resistance, and swelling resistance, as well as excellent in mechanical strength, rigidity, and insulation, thereby having a high practical utility value.

Further, in the refrigeration unit, an insulation film which serves as an electrical insulation material of a motor part is preferably one made of a crystalline plastic film having a glass transition temperature of 60° C. or more.

In particular, the crystalline plastic film may preferably be one containing an oligomer in amount of 5% by mass or less.

Preferable examples of such the crystalline plastic having a glass transition temperature of 60° C. or more include polyether nitrile, polyethylene terephthalate, polybutylene terephthalate, polyphenylene sulfide, polyether ether ketone, polyethylene naphthalate, polyamide imide, and polyimide.

In addition, the insulation film of the above-mentioned motor may be made of a single-layered crystalline plastic film; alternatively it may be a composite film in which a plastic layer having a high glass transition temperature covers a film having a low glass transition temperature.

In the refrigeration unit of the present invention, a rubber material for vibration insulation can be arranged in the compressor. In this case, the rubber material which is suitably used is one selected from acrylonitrile-butadiene rubber (NBR), ethylene-propylene-diene rubber (EPDM, EPM), hydrogenated acrylonitrile-butadiene rubber (HNBR), silicone rubber, and fluorine rubber (FKM). Particularly preferable is one having a rubber-swelling rate of 10% by mass or less.

Further, in the refrigeration unit of the present invention, any of various organic materials (e.g., lead wire-covering materials, binding threads, enameled wires, and insulation films) can be arranged in the compressor. In this case, however, the organic material, which can be suitably used, is one having a pulling strength lowering rate of 20% or less.

In the refrigeration unit of the present invention, further, it is preferable that a gasket in the compressor have a swelling rate of 20% or less.

Next, specific examples of the refrigeration unit of the present invention include a closed scroll compressor, a closed swing compressor, a closed round-trip compressor, and a closed rotary compressor.

Here, an example of the closed rotary compressor will be described with reference to the accompanying drawing.

FIG. 1 is a cross-sectional diagram of a main part of an example of a closed twin-rotary compressor as one kind of the refrigeration unit of the present invention. A motor part (electric motor part) is housed in a case 1 as a sealed container, which also serves as an oil reservoir, on the upper stage. In addition, a compressor part is housed in the case on the lower stage. The motor part is constructed of a stator (stationary part) 2 and a motor roller (rotator) 3, in which a rotation shaft 4 is attached to the motor roller 3 by fitting together.

In addition, a winding part 5 of the stator 2 has a core wire generally covered with an enameled wire, and furthermore an electrical insulation film is arranged between the core wire and the winding part of the stator 2 by insertion.

On the other hand, a compressor part is constructed of two compression chambers, that is, an upper compression chamber 6 and a lower compression chamber 7.

The compressor discharges compressed refrigerant gas alternately from the upper and lower compression chambers 6 and 7 at a phase difference of 180 degrees.

In the compression chamber, a cylindrical rotating piston is driven by a crank inserted therein and then eccentrically rotates while touching one point of the wall surface of the cylinder.

In addition, a blade is spring-loaded and reciprocates so that the tip of the blade can always touch the rotating piston.

Here, when the rotating piston eccentrically rotates, the capacity of one of two spaces divided by the blade decreases, thereby compressing refrigerant gas. When the pressure reaches a certain degree, a valve provided on a bearing flange surface opens, thereby discharging the refrigerant gas outside.

The opened compressor may be a car air-conditioner, the semi-closed compressor may be a high-speed multi-cylindered compressor, and the canned motor compressor may be an ammonia compressor.

EXAMPLES

Next, the present invention will be described in more detail with reference to examples. However, the present invention is not limited by the examples described below.

Catalyst Preparation Example 1

A 2-liter autoclave made of SUS316L was fed with 6 g of a nickel diatomaceous earth catalyst (a product of Nikki Chemical Co., Ltd.; N113) and 300 g of isooctane. The autoclave was purged with nitrogen and then purged with hydrogen, followed by increasing the temperature therein while the pressure of hydrogen was adjusted to 3.0 MPaG. After retaining the autoclave at 140° C. for 30 minutes, the autoclave was cooled to room temperature.

The autoclave was purged with nitrogen and then fed with 10 g of acetaldehyde diethyl acetal. The autoclave was purged with nitrogen again and then purged with hydrogen, followed by increasing the temperature therein while the pressure of hydrogen was adjusted to 3.0 MPaG.

After retaining the autoclave at 130° C. for 30 minutes, the autoclave was cooled to room temperature.

A decrease in hydrogen pressure was confirmed as the reaction of acetaldehyde diethyl acetal proceeded while an increase in temperature allowed an increase in inner pressure of the autoclave.

When the pressure decreased to 3.0 MPaG or less, hydrogen was additionally supplied, thereby keeping the reaction pressure at 3.0 MPaG. The autoclave was cooled to room temperature and then depressurized. Subsequently, the autoclave was purged with nitrogen and then depressurized.

Production Example 1

A 1-liter separable flask made of glass was fed with 60.5 g of isooctane, 30.0 g ($2.50 \times 10^{-1}$ mol) of diethylene glycol-monomethyl ether, and 0.296 g of a boron trifluoride diethyl ether complex.

Subsequently, 216.3 g (3.00 mol) of ethyl vinyl ether was added over 3 hours and 35 minutes.

A reaction was exothermic, so a reaction solution was kept at 25° C. by placing the flask in an ice-water bath.

After that, the reaction solution was transferred to a 1-liter separation funnel and washed with 50 ml of a 5% by mass aqueous solution of sodium hydroxide and then washed with 100 ml of distilled water six times, followed by removing the solvent and volatile components using a rotary evaporator under reduced pressure. Consequently, 235.1 g of a crude product was obtained.

The crude product had kinematic viscosities of 79.97 mm$^2$/s at 40° C. and 9.380 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by increasing the temperature therein while the pressure of hydrogen was adjusted to 3.0 MPaG.

After retaining the autoclave at 160° C. for 3 hours, the autoclave was cooled to room temperature.

A decrease in hydrogen pressure was confirmed as the reaction proceeded while an increase in temperature allowed an increase in inner pressure of the autoclave.

When the pressure of hydrogen decreases, hydrogen was suitably supplied, thereby keeping the inside of the autoclave at 3.0 MPaG.

The autoclave was purged with nitrogen and then depressurized, followed by recovering a reaction solution and then removing the catalyst therefrom by filtration.

A filtrate was subjected to a rotary evaporator under reduced pressure to remove the solvent and volatile components. Consequently, a base oil 1 was obtained. The yield thereof was 88.5 g.

A theoretical structure of the base oil 1 estimated from the feed was (A) $R^y = CH_2CH_2$, m=2, $R^z = CH_3$, (B) $R^x = CH_2CH_3$, (A)/(B) molar ratio (k/p)=1/11, k+p=12 (average value), and a calculated molecular weight of 940, from the formula (X) represented below.

In addition, a carbon/oxygen molar ratio was 3.64.

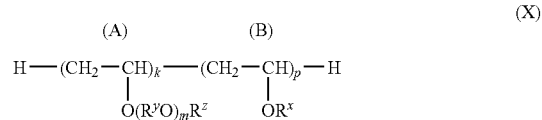

(X)

Production Example 2

A 1-liter separable flask made of glass was fed with 60.5 g of isooctane, 25.0 g ($1.69 \times 10^{-1}$ mol) of dipropylene glycol monomethyl ether, and 0.200 g of a boron trifluoride diethyl ether complex.

Subsequently, 133.8 g (1.86 mol) of ethyl vinyl ether was added over 3 hours.

After that, 151.8 g of a crude product was obtained by the same way as that of Production Example 1.

The crude product had kinematic viscosities of 86.24 mm$^2$/s at 40° C. and 9.620 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 2 by the same way as that of Production Example 1. The yield thereof was 92.4 g.

A theoretical structure of the base oil 2 estimated from the feed is (A) $R^y = CH(CH_3)CH_2$, m=2, $R^z = CH_3$, (B) $R^x = CH_2CH_3$, (A)/(B) molar ratio (k/p)=1/10, k+p=11 (average value), and a calculated molecular weight of 896, from the formula (X).

In addition, the carbon/oxygen molar ratio is 3.77.

Production Example 3

A 1-liter separable flask made of glass was fed with 60.5 g of toluene, 25.0 g ($1.52 \times 10^{-1}$ mol) of triethylene glycol monomethyl ether, and 0.180 g of a boron trifluoride diethyl ether complex.

Subsequently, 158.0 g (2.19 mol) of ethyl vinyl ether was added over 2 hours and 25 minutes.

After that, 174.7 g of a crude product was obtained by the same way as that of Production Example 1.

The crude product had kinematic viscosities of 81.98 mm$^2$/s at 40° C. and 9.679 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 3 by the same way as that of Production Example 1. The yield thereof was 93.0 g.

A theoretical structure of the base oil 3 estimated from the feed is (A) $R^y$=CH$_2$CH$_2$, m=3, $R^z$=CH$_3$, (B) $R^x$=CH$_2$CH$_3$, (A)/(B) molar ratio (k/p)=1/13.4, k+p=14.4 (average value), and a calculated molecular weight of 1,157, from the formula (X).

In addition, the carbon/oxygen molar ratio is 3.60.

Production Example 4

A 1-liter separable flask made of glass was fed with 60.5 g of isooctane, 51.6 g ($2.50 \times 10^{-1}$ mol) of tripropylene glycol monomethyl ether, and 0.296 g of a boron trifluoride diethyl ether complex.

Subsequently, 198.4 g (2.75 mol) of ethyl vinyl ether was added over 3 hours and 10 minutes. 241.7 g of a crude product was obtained by the same way as that of Production Example 1.

The crude product had kinematic viscosities of 83.13 mm$^2$/s at 40° C. and 9.755 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 4 by the same way as that of Production Example 1. The yield thereof was 92.6 g.

A theoretical structure of the base oil 4 estimated from the feed is (A) $R^y$=CH(CH$_3$)CH$_2$, m 3, $R^z$=CH$_3$, (B) $R^x$=CH$_2$CH$_3$, (A)/(B) molar ratio (k/p)=1/10, k+p=11 (average value), and a calculated molecular weight of 954, from the formula (X).

In addition, the carbon/oxygen molar ratio is 3.71.

Production Example 5

A 1-liter separable flask made of glass was fed with 43 g of toluene, 6.09 g ($8.00 \times 10^{-2}$ mol) of 2-methoxyethanol, and 0.095 g of a boron trifluoride diethyl ether complex.

Subsequently, 102.1 g (1.00 mol) of methoxyethyl vinyl ether was added over 3 hours and 35 minutes.

A reaction was exothermic, so a reaction solution was kept at 25° C. by placing the flask in an ice-water bath. After completion of the reaction, the reaction solution was transferred to a 1-liter separation funnel, followed by addition of an aqueous solution of 10% by mass of sodium hydroxide until the reaction solution was alkalinized.

Subsequently, the reaction solution was transferred to a 1-liter eggplant-shaped flask, added with an ion-exchange resin, and stirred to neutralize the reaction solution.

From the solution, the solvent, water, and volatile components were removed using a rotary evaporator under reduced pressure, resulting in 106.4 g of a crude product.

The crude product had kinematic viscosities of 78.53 mm$^2$/s at 40° C. and 12.34 mm$^2$/s at 100° C.

Next, the autoclave containing the catalyst prepared in Catalyst Preparation Example 1 was opened and a liquid layer was then removed by decantation, followed by charging 300 g of isooctane, 50 g of 2-methoxyethanol, and 68 g of the above-mentioned crude product.

The autoclave was purged with nitrogen and then purged with hydrogen, followed by increasing the temperature therein while the pressure of hydrogen was adjusted to 3.0 MPaG.

After retaining the autoclave at 160° C. for 3 hours, the autoclave was cooled to room temperature.

It was recognized that an increase in temperature caused an increase in pressure of the autoclave, while the hydrogen pressure decreased as the reaction proceeded.

When the hydrogen pressure decreased, hydrogen was additionally supplied, thereby keeping the reaction pressure at 3.0 MPaG.

The autoclave was purged with nitrogen and then depressurized, followed by collecting the reaction solution and removing the catalyst by filtration.

A filtrate was subjected to a rotary evaporator under reduced pressure to remove the solvent and the volatile components, thereby obtaining a base oil 5. The yield thereof was 57.3 g.

A theoretical structure of the base oil 5 estimated from the feed is (A) $R^y$=CH$_2$CH$_2$, m=1, $R^z$=CH$_3$, (B) p=0, k=12.5 (average value), and a calculated molecular weight of 1,277, from the formula (X).

In addition, the carbon/oxygen molar ratio is 2.50.

Production Example 6

A 1-liter separable flask made of glass was fed with 60.5 g of isooctane, 50.0 g ($1.85 \times 10^{-1}$ mol) of polypropylene glycol monomethyl ether (having an average molecular weight of about 270), and 0.224 g of a boron trifluoride diethyl ether complex. Subsequently, 122.8 g (1.70 mol) of ethyl vinyl ether was added over 1 hour and 50 minutes.

After that, 167.7 g of a crude product was obtained by the same way as that of Production Example 1.

The crude product had kinematic viscosities of 67.23 mm$^2$/s at 40° C. and 8.991 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 6 by the same way as that of Production Example 1. The yield thereof was 92.9 g.

A theoretical structure of the base oil 6 estimated from the feed is (A) $R^y$=CH(CH$_3$)CH$_2$, m=4.1 (average value), $R^z$=CH$_3$, (B) $R^x$=CH$_2$CH$_3$, (A)/(B) molar ratio (k/p)=1/8.2, k+p=9.2 (average value), and a calculated molecular weight of 888, from the formula (X).

In addition, the carbon/oxygen molar ratio is 3.62.

Production Example 7

A 1-liter separable flask made of glass was fed with 60.5 g of isooctane, 55.0 g (1.72×10⁻¹ mol) of polypropylene glycol monomethyl ether (having an average molecular weight of about 320), and 0.202 g of a boron trifluoride diethyl ether complex.

Subsequently, 123.0 g (1.71 mol) of ethyl vinyl ether was added over 1 hour and 50 minutes.

After that, 172.6 g of a crude product was obtained by the same way as that of Production Example 1.

The crude product had kinematic viscosities of 81.59 mm²/s at 40° C. and 10.50 mm²/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 7 by the same way as that of Production Example 1. The yield thereof was 93.3 g.

A theoretical structure of the base oil 7 estimated from the feed is (A) $R^yCH(CH_3)CH_2$, m=5.0 (average value), $R^z=CH_3$, (B) $R^x=CH_2CH_3$, (A)/(B) molar ratio (k/p)=1/8.9, k+p=9.9 (average value), and a calculated molecular weight of 991, from the formula (X).

In addition, the carbon/oxygen molar ratio is 3.60.

Production Example 8

A 1-liter separable flask made of glass was fed with 60.5 g of isooctane, 70.0 g (1.79×10⁻¹ mol) of polypropylene glycol monomethyl ether (having an average molecular weight of about 390), and 0.218 g of a boron trifluoride diethyl ether complex.

Subsequently, 106.2 g (1.47 mol) of ethyl vinyl ether was added over 1 hour and 35 minutes.

After that, 168.8 g of a crude product was obtained by the same way as that of Production Example 1.

The crude product had kinematic viscosities of 59.08 mm²/s at 40° C. and 8.930 mm²/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 8 by the same way as that of Production Example 1. The yield thereof was 92.9 g.

A theoretical structure of the base oil 8 estimated from the feed is (A) $R^y=CH(CH_3)CH_2$, m=6.2 (average value), $R^z=CH_3$, (B) $R^x=CH_2CH_3$, (A)/(B) molar ratio (k/p)=1/7.2, k+p=8.2 (average value), and a calculated molecular weight of 938, from the formula (X).

In addition, the carbon/oxygen molar ratio is 3.50.

Production Example 9

A 1-liter separable flask made of glass was fed with 60.5 g of isooctane, 70.0 g (1.59×10⁻¹ mol) of polypropylene glycol monomethyl ether (having an average molecular weight of about 440), and 0.189 g of a boron trifluoride diethyl ether complex.

Subsequently, 103.6 g (1.47 mol) of ethyl vinyl ether was added over 1 hour 30 minutes.

After that, 167.2 g of a crude product was obtained by the same way as that of Production Example 1.

The crude product had kinematic viscosities of 75.63 mm²/s at 40° C. and 10.75 mm²/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining Production a base oil 9 by the same way as that of Production Example 1. The yield thereof was 93.0 g.

A theoretical structure of the base oil 9 estimated from the feed is (A) $R^y=CH(CH_3)CH_2$, m=7.0 (average value), $R^z=CH_3$, (B) $R^x=CH_2CH_3$, (A)/(B) molar ratio (k/p)=1/8.2, k+p=9.2 (average value), and a calculated molecular weight of 1,056, from the formula (X).

In addition, the carbon/oxygen molar ratio is 3.51.

Production Example 10

A 1-liter separable flask made of glass was fed with 60.6 g of isooctane, 30.9 g (1.50×10⁻¹ mol) of tripropylene glycol monomethyl ether, and 0.178 g of a boron trifluoride diethyl ether complex.

Subsequently, 162.3 g (2.25 mol) of ethyl vinyl ether was added over 1 hour and 44 minutes.

After that, 189.4 g of a crude product was obtained by the same way as that of Production Example 1.

The crude product had kinematic viscosities of 257.3 mm²/s at 40° C. and 20.03 mm²/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 10 by the same way as that of Production Example 1. The yield thereof was 93.1 g.

A theoretical structure of the base oil 10 estimated from the feed is (A) $R^y=CH(CH_3)CH_2$, m=3, $R^z=CH_3$, (B) $R^x=CH_2CH_3$, (A)/(B) molar ratio (k/p)=1/14, k+p=15 (average value), and a calculated molecular weight of 1,242, from the formula (X).

In addition, the carbon/oxygen molar ratio is 3.78.

Production Example 11

A 1-liter separable flask made of glass was fed with 60.5 g of isooctane, 60.6 g (1.35×10⁻¹ mol) of polypropylene glycol monomethyl ether (having an average molecular weight of about 450) and 0.166 g of a boron trifluoride diethyl ether complex.

Subsequently, 121.2 g (1.68 mol) of ethyl vinyl ether was added over 1 hour 20 minutes.

After that, 177.6 g of a crude product was obtained by the same way as that of Production Example 1.

The crude product had kinematic viscosities of 138.2 mm²/s at 40° C. and 15.61 mm²/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 11 by the same way as that of Production Example 1. The yield thereof was 93.7 g.

A theoretical structure of the base oil 11 estimated from the feed is (A) $R^y$=CH(CH$_3$)CH$_2$, m=7.2 (average value), $R^z$=CH$_3$, (B) $R^x$=CH$_2$CH$_3$, (A)/(B) molar ratio (k/p)=1/11.4, k+p=12.4 (average value), and a calculated molecular weight of 1,298, from the formula (X).

In addition, the carbon/oxygen molar ratio is 3.58.

Production Example 12

A 1-liter separable flask made of glass was fed with 60.5 g of isooctane, 76.6 g (1.20×10$^{-1}$ mol) of polypropylene glycol monomethyl ether (having an average molecular weight of about 640) and 0.148 g of a boron trifluoride diethyl ether complex.

Subsequently, 108.2 g (1.50 mol) of ethyl vinyl ether was added over 1 hour and 10 minutes.

After that, 180.7 g of a crude product was obtained by the same way as that of Production Example 1.

The crude product had kinematic viscosities of 152.1 mm$^2$/s at 40° C. and 18.36 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 12 by the same way as that of Production Example 1. The yield thereof was 94.9 g.

A theoretical structure of the base oil 12 estimated from the feed is (A) $R^y$=CH(CH$_3$)CH$_2$, m=10.5 (average value), $R^z$=CH$_3$, (B) $R^x$=CH$_2$CH$_3$, (A)/(B) molar ratio (k/p)=1/11.5, k+p=12.5 (average value), and a calculated molecular weight of 1,497, from the formula (X).

In addition, the carbon/oxygen molar ratio is 3.50.

Production Example 13

A 1-liter separable flask made of glass was fed with 60.5 g of isooctane, 112.9 g (1.23×10$^{-1}$ mol) of polypropylene glycol monomethyl ether (having an average molecular weight of about 915), and 0.148 g of a boron trifluoride diethyl ether complex.

Subsequently, 72.1 g (1.00 mol) of ethyl vinyl ether was added over 50 minutes. After that, 178.6 g of a crude product was obtained by the same way as that of Production Example 1.

The crude product had kinematic viscosities of 121.8 mm$^2$/s at 40° C. and 18.54 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 13 by the same way as that of Production Example 1. The yield thereof was 95.4 g.

A theoretical structure of the base oil 13 estimated from the feed is (A) $R^y$=CH(CH$_3$)CH$_2$, m=15.0 (average value), $R^z$=CH$_3$, (B) $R^x$=CH$_2$CH$_3$, (A)/(B) molar ratio (k/p)=1/7.1, k+p=8.1 (average value), and a calculated molecular weight of 1,441, from the formula (X).

In addition, the carbon/oxygen molar ratio is 3.31.

Production Example 14

A 1-liter separable flask made of glass was fed with 60.5 g of isooctane, 149.2 g (1.19×10$^{-1}$ mol) of polypropylene glycol monomethyl ether (having an average molecular weight of about 1,250), and 0.148 g of a boron trifluoride diethyl ether complex.

Subsequently, 36.1 g (0.50 mol) of ethyl vinyl ether was added over 50 minutes while the temperature of the reaction solution was kept at 25° C.

After that, 179.4 g of a crude product was obtained by the same way as that of Production Example 1.

The crude product had kinematic viscosities of 121.5 mm$^2$/s at 40° C. and 20.88 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 14 by the same way as that of Production Example 1. The yield thereof was 96.2 g.

A theoretical structure of the base oil 14 estimated from the feed is (A) $R^y$=CH(CH$_3$)CH$_2$, m=21.0 (average value), $R^z$=CH$_3$, (B) $R^x$=CH$_2$CH$_3$, (A)/(B) molar ratio (k/p)=1/3.2, k+p 4.2 (average value), and a calculated molecular weight of 1,508, from the formula (X).

In addition, the carbon/oxygen molar ratio is 3.13.

Production Example 15

A 1-liter separable flask made of glass was fed with 60.5 g of tetrahydrofuran, 25.5 g (2.45×10$^{-1}$ mol) of neopentyl glycol, and 0.579 g of a boron trifluoride diethyl ether complex.

Subsequently, 176.7 g (2.45 mol) of ethyl vinyl ether was added over 2 hours and 35 minutes.

A reaction was exothermic, so a reaction solution was kept at 25° C. by placing the flask in an ice-water bath.

After that, 50 ml of an aqueous solution of 5% by mass of sodium hydroxide was added to the reaction solution to terminate the reaction, followed by addition of 100 g of isooctane. Tetrahydrofuran, the reaction solvent, was removed using a rotary evaporator under reduced pressure.

Subsequently, the reaction solution was transferred to a 1-liter separating funnel and a lower layer was then removed, followed by washing four times with 100 ml of distilled water. After that, the solvent and volatile components were removed using a rotary evaporator under reduced pressure, resulting in 155.8 g of a crude product.

The crude product had kinematic viscosities of 95.17 mm$^2$/s at 40° C. and 9.868 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by obtaining a base oil 15 by the same way as that of Production Example 1. The yield thereof was 88.9 g.

A theoretical structure of the base oil 15 estimated from the feed is (A) $R^c$=CH$_2$C(CH$_3$)$_2$CH$_2$, $R^d$=CHCH$_2$, $R^e$=$R^5$=$R^6$=$R^7$=H, n=0, $R^9$=CH$_2$CH$_3$, a total of b in a molecule is 8 (average value), a=1, c=1, d=2, and a calculated molecular weight of 737, from the formulae (II) and (III).

In addition, the carbon/oxygen molar ratio is 4.10.

Production Example 16

A 1-liter separable flask made of glass was fed with 50.6 g of isooctane, 13.8 g (3.00×10$^{-1}$ mol) of ethanol, and 0.355 g of a boron trifluoride diethyl ether complex.

Subsequently, 216.3 g (3.00 mol) of ethyl vinyl ether was added over 3 hours.

A reaction was exothermic, so a reaction solution was kept at 25° C. by placing the flask in an ice-water bath.

After the addition of all monomers, the reaction solution was continuously stirred for additional 20 minutes and 19.6 g (3.16×10$^{-1}$ mol) of ethylene glycol was then added and stirred for 5 minutes.

The solvent and eliminated ethanol were distilled off using a rotary evaporator. After that, the reaction solution was added with 50 g of isooctane and then transferred to a 2-liter washing tank, in which it was washed with 200 ml of a 3% by mass aqueous solution of sodium hydroxide and then washed with 200 ml of distilled water six times.

The solvent and volatile components of the washing liquid were removed using a rotary evaporator under reduced pressure. Consequently, 207.8 g of a crude product was obtained.

Next, the autoclave containing the catalyst prepared in Catalyst Preparation Example 1 was opened and a liquid layer was then removed by decantation, followed by charging 300 g of isooctane and 100 g of the above-mentioned crude product.

The autoclave was purged with nitrogen and then purged with hydrogen, followed by increasing the temperature therein while the pressure of hydrogen was adjusted to 3.0 MPaG.

After retaining the autoclave at 160° C. for 6 hours, the autoclave was cooled to room temperature.

A decrease in hydrogen pressure was confirmed as the reaction proceeded while an increase in temperature allowed an increase in inner pressure of the autoclave.

When the pressure of hydrogen decreases, hydrogen was suitably supplied, thereby keeping the inside of the autoclave at 3.0 MPaG.

The autoclave was purged with nitrogen and then depressurized, followed by recovering a reaction solution and then removing the catalyst therefrom by filtration.

A filtrate was subjected to a rotary evaporator under reduced pressure to remove the solvent and volatile components. Consequently, 92.3 g of a polyvinyl ether crude product having a hydroxyl group on an end was obtained.

A 30-ml eggplant-shaped flask was fed with 0.80 g of sodium hydride (oiliness, 60 to 72%) and an oil content was then removed by washing with hexane, followed by the addition of 73.8 g of the above-mentioned polyvinyl ether crude product having the hydroxyl group on the end.

Upon the addition, bubbling was observed and sodium hydride was then dissolved.

The solution was transferred to a 200-ml autoclave, 30 ml of triethylene glycol dimethyl ether and 23.2 g (4.00×10$^{-1}$ mol) of propylene oxide were added thereto and the temperature thereof was then raised.

It was kept at 110° C. for 8 hours, followed by cooling down to room temperature.

A decrease in pressure was confirmed as the reaction proceeded while an increase in temperature allowed an increase in inner pressure of the autoclave.

A 300-ml eggplant-shaped flask was fed with 5.20 g of sodium hydride (oiliness, 60 to 72%) and an oil content was then removed by washing with hexane, followed by the addition of 40 ml of triethylene glycol dimethyl ether and the above-mentioned polymerization solution.

Upon the addition of the polymerization solution, bubbling was observed.

Subsequently, 28.4 g (2.00×10$^{-1}$ mol) of methyl iodide was added over 2 hours and 30 minutes.

After completion of the addition of all of methyl iodide, the solution was continuously stirred for additional 3 hours. After that, a small amount of ethanol was added to confirm the absence of bubbling. Subsequently, the solution was added with 60 ml of isooctane and then transferred to a 500-ml separation funnel.

After washing 10 times with 60 ml of pure water, the solvent was removed using the rotary evaporator under reduced pressure. Consequently, a base oil 16 was obtained. The yield thereof was 93.2 g.

A standard theoretical structure of the base oil 16 estimated from the feed and the yield of the final product is represented by the following formula (XI) and a calculated molecular weight of 932.

In addition, a carbon/oxygen molar ratio was 3.57.

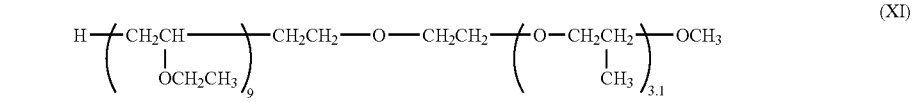

(XI)

The characteristics of the respective compounds were determined and evaluated by the following methods:

(1) Kinematic Viscosity

The kinematic viscosities of sample oil were measured at 100° C. and 40° C. on the basis of JIS K2283, respectively.

(2) Viscosity Index

From the obtained kinematic viscosities, a viscosity index was determined on the basis of JIS K2283.

(3) Pour Point

A pour point was measured on the basis of JIS K2269.

(4) Examination of Miscibility to Refrigerant

The refrigerant miscibility of each sample oil was evaluated on the basis of "Test Method for Miscibility to Refrigerant" in "Refrigerator Oil", JIS K2211 by using carbon dioxide as a refrigerant.

To be specific, each sample oil was blended in a refrigerant so as to be in amounts of 10, 20, and 30% by mass, and a temperature was then gradually increased from −50° C. to 20° C., followed by measuring the temperature at which the sample had caused separation or had become opaque.

In Table 1, "20<" indicates that there is no separation or opaqueness at 20° C.

(5) Wear resistance test

Block wear width was determined under the conditions described below by using a sealed Block-on-ring test machine placed under carbon dioxide atmosphere.

Loading: 100 N, number of revolution: 1,000 rpm, test time: 20 minutes, temperature: 50° C., partial pressure of refrigerant carbon dioxide): 1 MPa, block/ring: A4032/Mo—Ni—Cr cast iron (6) Storage stability test The presence or absence of the sludge deposition after storage at −5° C. for 5 days was evaluated.

Examples 1 to 16 and Comparative Examples 1 and 2

As samples for Examples 1 to 16, base oils 1 to 16 each obtained in Production Examples 1 to 16, respectively, were used. As a sample for Comparative Example 1, a commercially available polyalkylene glycol (PAG oil) [manufactured by Idemitsu Kosan Co., Ltd., trade name: Daphne Hermetic Oil PS] was used, and as a sample for Comparative Example 2, a commercially available polyalkylene glycol (PAG oil) [manufactured by Idemitsu Kosan Co., Ltd., trade name: Daphne Hermetic Oil PZ100S] was used.

For each samples, kinematic viscosity (40° C., 100° C.), viscosity index, pour point, and miscibility are determined.

The results are shown in Table 1 and Table 2.

Table 1 shows values of physical properties of base oils having kinetic viscosities of about 10 $mm^2/s$ at 100° C. among those in Examples and Comparative Examples. The base oils of Examples 1 to 9, 15, and 16 of the present invention have good miscibilities, respectively, compared with PAG oil of Comparative Example 1.

Those base oils of the present invention are particularly suitable for lubricating oil for car air-conditioners.

Table 2 shows values of physical properties of base oils having kinetic viscosities of about 20 $mm^2/s$ at 100° C. among those in Examples and Comparative Examples.

The base oils of Examples 10 to 14 of the present invention have good miscibilities, respectively, compared with PAG oil of Comparative Example 2.

Those base oils of the present invention are particularly suitable for lubricating oil for showcases, vending machines, and water heaters.

Examples 17 to 22 and Comparative Examples 3 to 5

Base oils 4, 9, 12, and 13 each obtained in Production Examples 4, 9, 12, and 13, an organic carboxylic metal salt, a dissolving assistant, an extreme-pressure agent, a acid scavenger, an antioxidant, and an anti-foaming agent described below were used for samples in Examples 17 to 22 and Comparative Examples 3 to 5, respectively. Each of the obtained lubricating oils was evaluated for performance.

TABLE 1

| | Lubricating oil | Kinematic viscosity $mm^2/s$ | | Viscosity index | Pour Point (° C.) | Compatibility (° C.) | | |
|---|---|---|---|---|---|---|---|---|
| | | @40° C. | @100° C. | | | 10% by Mass oil | 20% by Mass oil | 30% by Mass oil |
| Example 1 | Base oil 1 | 65.27 | 8.758 | 107 | −40.0 | 11.2 | 17.1 | 17.1 |
| Example 2 | Base oil 2 | 73.17 | 9.352 | 104 | −37.5 | 8.6 | 13.5 | 20< |
| Example 3 | Base oil 3 | 69.91 | 9.351 | 111 | −40.0 | 5.5 | 9.6 | 20< |
| Example 4 | Base oil 4 | 71.51 | 9.433 | 109 | −40.0 | 5.2 | 10.6 | 20< |
| Example 5 | Base oil 5 | 69.99 | 11.47 | 158 | −47.5 | 4.0 | 8.8 | 20< |
| Example 6 | Base oil 6 | 61.16 | 8.955 | 123 | −40.0 | 0.2 | 5.7 | 20< |
| Example 7 | Base oil 7 | 75.09 | 10.46 | 124 | −45.0 | −7.0 | −8.0 | 20< |
| Example 8 | Base oil 8 | 58.52 | 9.359 | 141 | −47.5 | −11.8 | −5.0 | 6.7 |
| Example 9 | Base oil 9 | 71.75 | 10.92 | 142 | −42.5 | −24.5 | −10.1 | 20< |
| Example 15 | Base oil 15 | 92.81 | 10.37 | 92 | −32.5 | 4.2 | 11.9 | 20< |
| Example 16 | Base oil 16 | 71.43 | 9.513 | 111 | −37.5 | 5.6 | 10.2 | 20< |
| Comparative Example 1 | Commercially available oil 1 | 49.49 | 10.41 | 215 | −52.5 | Separated | Separated | Separated |

TABLE 2

| | Lubricating oil | Kinematic viscosity $mm^2/s$ | | Viscosity index | Pour Point (° C.) | Compatibility (° C.) | | |
|---|---|---|---|---|---|---|---|---|
| | | @40° C. | @100° C. | | | 10% by Mass oil | 20% by Mass oil | 30% by Mass oil |
| Example 10 | Base oil 10 | 234.6 | 20.10 | 99 | −27.5 | 6.0 | 20< | 20< |
| Example 11 | Base oil 11 | 135.9 | 16.29 | 128 | −37.5 | Separated | 20< | 20< |
| Example 12 | Base oil 12 | 151.6 | 19.10 | 143 | −35.0 | −50 | −50 | 20< |
| Example 13 | Base oil 13 | 118.5 | 18.54 | 176 | −45.0 | Separated | −49.0 | −40.3 |
| Example 14 | Base oil 14 | 96.17 | 17.10 | 194 | −42.5 | Separated | −50.0 | −50.0 |
| Comparative Example 2 | Commercially available oil 2 | 104.9 | 20.10 | 217 | −42.5 | Separated | Separated | Separated |

The results are shown in Table 3.
1. Lubricity improving agent: organic carboxylic acid metal salt Potassium oleate (A1), sodium oleate (A2), lithium laurate (A3), potassium oleate (A4), iron oleate (A5), lead oleate (A6)
2. Dissolving assistant: dipropylene glycol (B1)
3. Extreme-pressure agent: tricresyl phosphate (C1)
4. Acid scavenger: C14 α-olefin oxide (D1)
5. Antioxidant: 2,6-di-tert-butyl-4-methylphenol (E1)
6. Anti-foaming agent: silicone-based anti-foaming agent (F1)

TABLE 3

| | | | Example 17 | Example 18 | Example 19 | Example 20 | Example 21 |
|---|---|---|---|---|---|---|---|
| Lubricating oil No. | | | Lubricating oil 1 | Lubricating oil 2 | Lubricating oil 3 | Lubricating oil 4 | Lubricating oil 5 |
| Blending amount (% by mass) | Base oil | 4 | 96.4 | | | | 96.4 |
| | | 9 | | 96.4 | | | |
| | | 12 | | | 96.4 | | |
| | | 13 | | | | 96.4 | |
| | Organic carboxylic acid metal salt | A1 | 0.1 | 0.1 | 0.1 | 0.1 | |
| | | A2 | | | | | 0.1 |
| | | A3 | | | | | |
| | | A4 | | | | | |
| | | A5 | | | | | |
| | | A6 | | | | | |
| | Dissolving assistant | B1 | 1 | 1 | 1 | 1 | 1 |
| | Extreme-pressure agent | C1 | 1 | 1 | 1 | 1 | 1 |
| | Acid scavenger | D1 | 1 | 1 | 1 | 1 | 1 |
| | Antioxidant | E1 | 0.5 | 0.5 | 0.5 | 0.5 | 0.5 |
| | Anti-foaming agent | F1 | 0.001 | 0.001 | 0.001 | 0.001 | 0.001 |
| Block wear width (mm) | | | 0.9 | 0.9 | 0.9 | 0.9 | 1.1 |
| Storage stability test | | | Absence of sludge deposition | Absence of sludge deposition | Absence of sludge deposition | Absence of sludge deposition | Absence of sludge deposition |

| | | | Example 22 | Comparative Example 3 | Comparative Example 4 | Comparative Example 5 |
|---|---|---|---|---|---|---|
| Lubricating oil No. | | | Lubricating oil 6 | Lubricating oil 7 | Lubricating oil 8 | Lubricating oil 9 |
| Blending amount (% by mass) | Base oil | 4 | 96.4 | 96.4 | 96.4 | 96.4 |
| | | 9 | | | | |
| | | 12 | | | | |
| | | 13 | | | | |
| | Organic carboxylic acid metal salt | A1 | | | | |
| | | A2 | | | | |
| | | A3 | 0.1 | | | |
| | | A4 | | 0.1 | | |
| | | A5 | | | 0.1 | |
| | | A6 | | | | 0.1 |
| | Dissolving assistant | B1 | 1 | 1 | 1 | 1 |
| | Extreme-pressure agent | C1 | 1 | 1 | 1 | 1 |
| | Acid scavenger | D1 | 1 | 1 | 1 | 1 |
| | Antioxidant | E1 | 0.5 | 0.5 | 0.5 | 0.5 |
| | Anti-foaming agent | F1 | 0.001 | 0.001 | 0.001 | 0.001 |
| Block wear width (mm) | | | 1.2 | — | — | — |
| Storage stability test | | | Absence of sludge deposition | Absence of sludge deposition | Presence of sludge deposition | Presence of sludge deposition |

As shown in Tables 1 to 3, the lubricating oil of the present invention is excellent in miscibility to a natural refrigerant as a refrigerant, lubricating properties, particularly wear resistance, and also storage stability.

Industrial Applicability

By using the lubricating oil and natural refrigerant of the present invention, the refrigeration unit of the present invention can be effectively employed in a refrigeration system as a compression type refrigerator, an air-conditioning system, a car air-conditioner system, a showcase, a water heater, a vending machine, a compressor fashioned compression type refrigerator such as a refrigerator, or the like.

The invention claimed is:

1. The lubricating oil for a compression type refrigerator, comprising:
   a polyvinyl ether-based compound containing an alkylene glycol or polyoxyalkylene glycol unit and a vinyl ether unit in a molecule and having a molecular weight in a range of 300 to 3,000;
   an organic carboxylic acid alkali metal salt of a carboxylic acid having 8 to 20 carbon atoms; and
   a dissolving assistant of said organic carboxylic acid alkali metal salt in an amount of 5 to 100 fold by mass based on an amount by mass of said organic carboxylic acid alkali metal salt, wherein the dissolving assistant comprises at least one member of the group consisting of ethylene glycol, diethylene glycol, triethylene glycol, tetraethylene glycol, propylene glycol, dipropylene glycol, 1,4-butylene glycol, 2,3-butylene glycol, hexylene glycol, octylene glycol, glycerin glycols and polyhydric alcohols;

wherein the polyvinyl ether-based compound has a structure represented by the general formula (I):

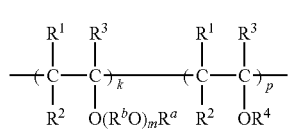

wherein $R^1$, $R^2$, and $R^3$ each represent a hydrogen atom or a hydrocarbon group having 1 to 8 carbon atoms, which may be identical to or different from one another; $R^b$ represents a divalent hydrocarbon group having 2 to 4 carbon atoms; $R^a$ represents a hydrogen atom, an aliphatic or alicyclic hydrocarbon group having 1 to 20 carbon atoms, an aromatic group which has 1 to 20 carbon atoms and may have a substituent, an acyl group having 2 to 20 carbon atoms, or an oxygen-containing hydrocarbon group having 2 to 50 carbon atoms; $R^4$ represents a hydrocarbon group having 1 to 10 carbon atoms; when plural $R^a$s, $R^b$s, and $R^4$s are present, they may be identical to or different from one another; m represents an average value of 2 to 50; k represents a number of 1 to 50; p represents a number of 2 to 25; and when plural ks and ps are present, units may be in block or in random form; and when plural $R^b$Os are present, they may be identical to or different from one another, wherein the polyvinyl ether-based compound has a carbon/oxygen molar ratio of 4.0 or less.

2. The lubricating oil for a compression type refrigerator according to claim 1, which has a kinematic viscosity at 100° C. in the range of 1 to 50 mm²/s.

3. The lubricating oil for a compression type refrigerator according to claim 1, which has a viscosity index of 80 or more.

4. The lubricating oil for a compression type refrigerator according to claim 1, which is used for a natural refrigerant.

5. The lubricating oil for a compression type refrigerator according to claim 4, wherein the natural refrigerant is at least one of a carbon dioxide refrigerant, an ammonia refrigerant, and a hydrocarbon refrigerant.

6. A refrigeration unit, comprising:
a compression type refrigerator for a natural refrigerant, which comprises at least a compressor, a condenser, an expansion mechanism, and an evaporator;
a natural refrigerant; and
the lubrication oil for a compression type refrigerator according to claim 4.

7. The refrigeration unit according to claim 6, wherein the natural refrigerant is a carbon dioxide refrigerant.

8. The lubricating oil for a compression type refrigerator according to claim 1, wherein said organic carboxylic acid alkali metal salt is at least one organic carboxylic acid selected from the group consisting of oleic acid and lauric acid.

9. The lubricating oil for a compression type refrigerator according to claim 1, wherein said alkali metal is at least one alkali metal selected from the group consisting of lithium, sodium and potassium.

10. The lubricating oil for a compression type refrigerator according to claim 1, wherein said organic carboxylic acid alkali metal salt is present in an amount of 0.001 to 5% by mass.

\* \* \* \* \*